(12) United States Patent
Weston et al.

(10) Patent No.: US 7,489,158 B2
(45) Date of Patent: Feb. 10, 2009

(54) FEEDBACK CIRCUIT FOR LINE LOAD COMPENSATION AND REFLECTION REDUCTION

(75) Inventors: Lance Weston, East Northport, NY (US); Richard H. Hinkson, Plainview, NY (US); David Mole, Medford, NY (US)

(73) Assignee: Honeywell International Inc., Morristown, NJ (US)

( * ) Notice: Subject to any disclaimer, the term of this patent is extended or adjusted under 35 U.S.C. 154(b) by 23 days.

(21) Appl. No.: 11/324,095

(22) Filed: Dec. 30, 2005

(65) Prior Publication Data

US 2007/0164779 A1 Jul. 19, 2007

(51) Int. Cl.
*H03K 17/16* (2006.01)
*H03K 19/003* (2006.01)
*H03K 19/094* (2006.01)
*H03K 19/173* (2006.01)
*G06F 7/38* (2006.01)

(52) U.S. Cl. .......................................... 326/26; 326/50
(58) Field of Classification Search .................. 326/26, 326/30
See application file for complete search history.

(56) References Cited

U.S. PATENT DOCUMENTS

| | | | | |
|---|---|---|---|---|
| 3,629,692 A | * | 12/1971 | Goyer | ........................ 323/315 |
| 6,172,541 B1 | * | 1/2001 | Young et al. | ................. 327/170 |
| 6,275,092 B1 | * | 8/2001 | Maggio et al. | ............... 327/424 |
| 6,362,678 B1 | * | 3/2002 | Bosnyak et al. | .............. 327/374 |
| 6,819,168 B1 | * | 11/2004 | Brewer | ........................ 327/560 |

OTHER PUBLICATIONS

Sedra et al. "Microelectronics Circuits: Fifth Edition" Oxford University Press (C) 2004. pp. 256-257, 546-555, 557-559, and 562-571.*
Sedra et al. "Microelectronics Circuits: Fifth Edition" Oxford University Press (C) 2004, pp. 256-257, 546-555, 557-559, and 562-57.*

* cited by examiner

*Primary Examiner*—Rexford Barnie
*Assistant Examiner*—Matthew C Tabler
(74) *Attorney, Agent, or Firm*—Scully, Scott, Murphy & Presser, P.C.

(57) ABSTRACT

Line load compensation and reflection reduction in a signal transmitting circuit is provided using feedback capacitors. The feedback capacitor serially coupled with a resistance generates an RC rise/fall time that is independent of the line load. Additionally, by selecting a capacitor that yields a rise/fall time of approximately ⅓ of the maximum bit transmission time, signal reflection on the signal line can be reduced. Accordingly, by incorporating the feedback capacitor with a differential drive circuit, such as the IB 485 driver, variations in line load can be compensated for while also reducing signal reflection due to un-terminated or improperly terminated signal lines, thus allowing a free topology implementation.

13 Claims, 4 Drawing Sheets

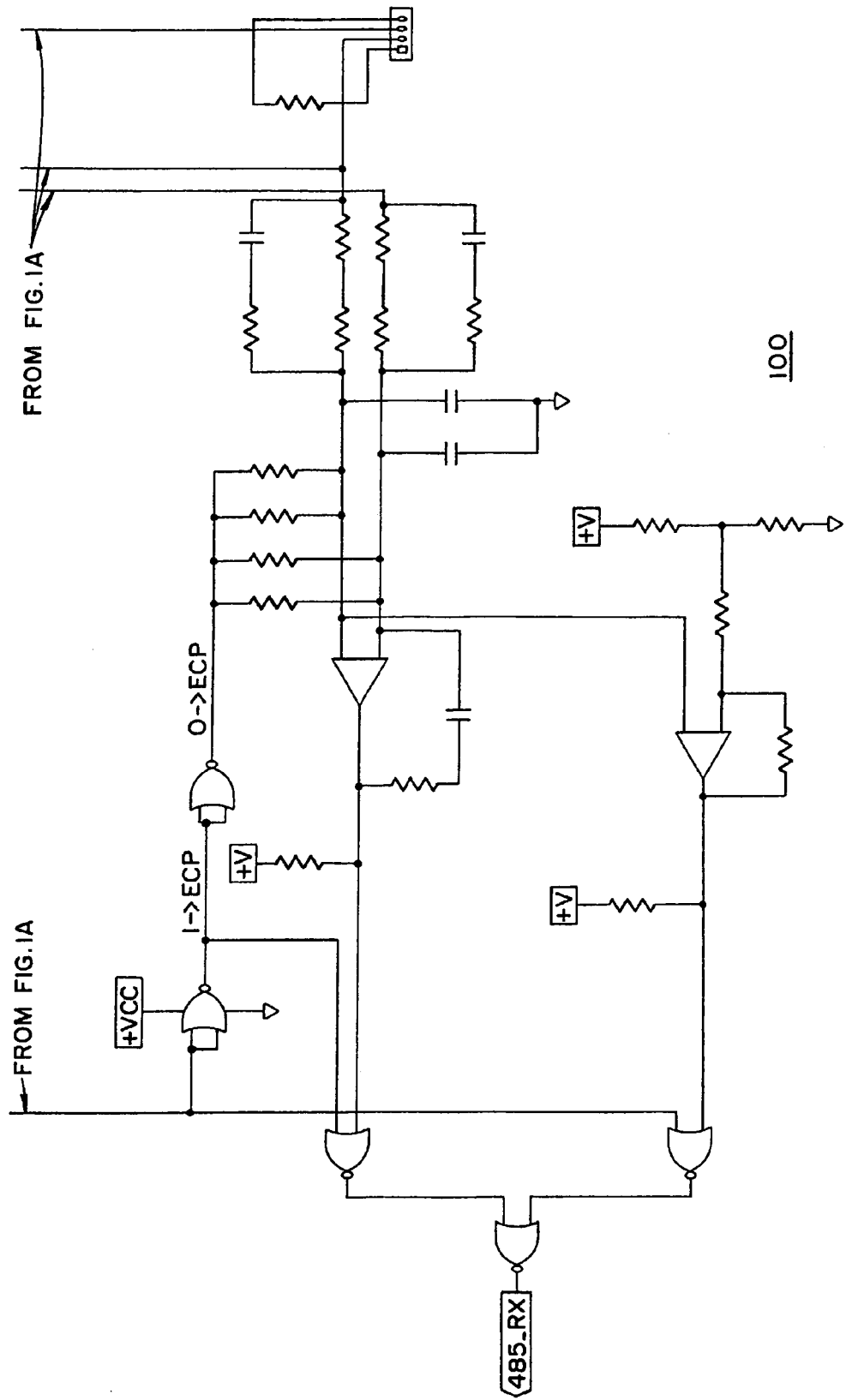
FIG. IB

FEEDBACK CIRCUIT FOR LINE LOAD COMPENSATION AND REFLECTION REDUCTION

I. BACKGROUND OF THE INVENTION

The present invention relates generally to electrical circuit device drivers. More specifically, the present invention is directed to a feedback circuit for line load compensation and reflection reduction in free-topology module wiring configurations.

Computer systems and control systems connect to peripherals, sensors, and other electronic devices by means of various connection methods. Wired devices can be connected in various configurations, or topologies, such as linear bus, tree, star and star-wired ring configurations. The topology used is generally dependent on the particular communication protocol being implemented. For example, Token Ring utilizes a star-wired ring topology, while RS-485 requires a linear bus typology. Each topology has benefits and disadvantages.

A linear bus topology consists of a main run of cable onto which, devices, or nodes, are patched. Linear bus topology is easy to connect and may be more economical over some other topologies because of reduced cable lengths, when properly routed. However, a break in the main cable results in the failure of the entire network. Terminators are required at least at one end of the main cable in order to reduce reflection of electrical signals within the main cable. Generally, troubleshooting network issues can be difficult especially if the problem causes the entire network to fail. A linear bus topology is not meant to be implemented as a stand-alone solution for large networks.

A star topology is configured with each node connected directly to a central hub. The data is transmitted to the hub and then relayed to the destination. The hub provides control of all functions of the network and acts as a repeater for the data flow. The star topology is often seen in home offices and other small networks because of the ease of installation and troubleshooting, and no network disruptions when adding or removing devices. However, star topology has the added cost of a hub over the linear bus and while generally reliable, if the hub fails, all nodes attached to the hub are disabled.

Star-wired ring topology is generally only used in Token Ring networks. While star-wired ring networks may outwardly look like star networks, internally, the multistation access unit is wired to allow information to pass from device to device in a circle or ring.

Tree topology is best thought of as a hybrid between a linear bus topology having branches of star topology networks. Thus, a linear bus forms a backbone linking multiple star networks. This topology is most often seen in large network implementations where each star network forms a local group, perhaps defining a department within a company, these department-based networks are linked together to form the network infrastructure of the whole company. Tree topology shares the benefits and disadvantages of both linear bus and star topologies.

Due to the Ethernet protocol requirement that a signal transmitted on the network cable must reach every part of the network within a specified length of time, the tree topology is limited in the number of hubs it can implement. Each hub adds a small amount of lag to the transmission. Consequently, when designing a tree network, care is taken to ensure that between any two nodes on the network there exits no more than 5 segments and no more that 4 hubs are used.

A free-topology architecture allows wiring of devices with virtually no topological restrictions. However, by its very nature, free-topology is subject to variable line, i.e., network cable, loads as well as signal reflection caused by unterminated lines. Devices connected using free-topology must be able to handle these variable line loads and produce output, which is independent of the load. In addition, circuitry must be present to reduce reflection.

While the above discussion of various wiring topologies centered on network implementations, the same basic topologies apply to peripheral connectivity, i.e., connecting multiple devices, sensors, actuators, etc. to a central controller or monitoring device. Specifically, this is most often seen in security monitoring systems, which may include various sensors, actuator-driven locks, video cameras, and alarms of various types. These peripheral devices need to be wired to one or more monitoring stations. The monitoring stations receive signals from these peripheral devices, process the data, and provide some warning signal when necessary. In addition, such monitoring stations may transmit signals to the peripheral devices for setting operating parameters, requesting status updates, etc., as well. Consequently, quite a bit of data can flow between a monitoring station and the various peripheral devices.

Additionally, many security systems are installed after a building or home has been built. In this post-construction case, it is difficult and costly to run wiring needlessly. Thus as with the networking implementations, wiring topologies need to be selected that provide the necessary data bandwidth while still being cost-effective and efficient to install.

Security monitoring systems that are tied to one topology or another are less desirable, in that such a system may be perfectly suited for one installation scenario, and woefully ill-suited for the multiple other installation scenarios that may be encountered. Accordingly, it is desirable to have a security monitoring system that allows for a broad range of topologies—a free-topology based security monitoring system.

II. SUMMARY OF THE INVENTION

An object of the present invention is to provide a differential drive circuit capable of supporting a free topology for wiring devices to a security monitoring system.

An additional object of the present invention is to provide a differential drive circuit having an output that is independent of the line load.

A further object of the present invention is to provide reduced reflection within the signal lines caused by un-terminated lines and devices.

Accordingly, a feedback sub-circuit is provided having a rise/fall time that is set at a fractional value of a bit transmission time. The bit transmission time is determined based on a baud rate and a maximum transmission line length desired. Preferentially, the fractional value is set to ⅓ of the bit transmission time.

Additionally, a feedback sub-circuit for line load compensation and reflection reduction is provided by way of the present invention. The feedback sub-circuit includes a first transistor, a second transistor and a third transistor. An emitter of the first transistor and a collector of the second transistor are connected to a base of the third transistor at a first node. A base of the second transistor is connected to an emitter of the third transistor at a second node. A first resistor has a first lead connected to an emitter of the second transistor at a third node, and a second lead connected to the second node. A positive lead of a voltage source is connected to the third node. A first lead of a second resistor is adapted for connecting to an input signal source having an arbitrarily selected load, and a second lead of the second resistor is connected to a base of the first transistor at a fourth node. A first lead of a third resistor is connected to the third node, and a second lead is connected to the fourth node. A first lead of a feedback capacitor is connected to the base of the first transistor at the fourth node, and a second lead is connected to a collector of the third transistor at the fifth node. A first lead of a fourth resistor is connected to a collector of the first transistor at a sixth node, and a second lead is connected to a ground potential. A first lead of a fifth resistor is connected to the fifth node and a first lead of a diode is connected to a second lead of the fifth resistor. The diode has a second lead adapted for emitting an output signal. The emitted output signal is independent of the load of the input signal.

Further, a differential drive circuit having a free topology and variable line load requirement is provided. The differential drive circuit has a plurality of feedback sub-circuits providing line load compensation and reflection reduction. Each feedback sub-circuit of the plurality of feedback sub-circuits includes a first transistor, a second transistor and a third transistor. An emitter of the first transistor and a collector of the second transistor are connected to a base of the third transistor at a first node. A base of the second transistor is connected to an emitter of the third transistor at a second node. A first resistor has a first lead connected to an emitter of the second transistor at a third node, and a second lead connected to the second node. A positive lead of a voltage source is connected to the third node. A first lead of a second resistor is adapted for connecting to an input signal source having an arbitrarily selected load, and a second lead of the second resistor is connected to a base of the first transistor at a fourth node. A first lead of a third resistor is connected to the third node, and a second lead is connected to the fourth node. A first lead of a feedback capacitor is connected to the base of the first transistor at the fourth node, and a second lead is connected to a collector of the third transistor at the fifth node. A first lead of a fourth resistor is connected to a collector of the first transistor at a sixth node, and a second lead is connected to a ground potential. A first lead of a fifth resistor is connected to the fifth node and a first lead of a diode is connected to a second lead of the fifth resistor. The diode has a second lead adapted for emitting an output signal. The emitted output signal is independent of the load of the input signal.

III. BRIEF DESCRIPTION OF THE DRAWINGS

These and other features, aspects, and advantages of the present invention will become better understood with regard to the following description, appended claims, and accompanying drawings wherein:

FIG. 1A and 1B illustrate a circuit schematic of an IB 485 device driver implementing the feedback compensation in accordance with the present invention;

IV DETAILED DESCRIPTION OF INVENTION

Differential drive circuits, such as the IB 485 driver, require a free typology, thus the line load is variable. However, allowing a variable load on a signal line may result in signal reflection due to unmatched impedances. To produce an output that is independent of the load, the present invention integrates feedback capacitors into the differential drive circuitry.

The feedback capacitors are selected so that the resulting rise/fall time is the slowest practical rise/fall time for a particular baud rate. Preferably, the slowest rise/fall time is ⅓ of the maximum bit transmission time, determined by the desired baud rate and maximum transmission line length. The rise/fall time is defined as the product of the capacitance and resistor time constant of the circuit. Therefore, the preferred rise/fall time is set by selecting the appropriate capacitance value of the feedback capacitor and/or adjusting the resistance of the feedback circuit.

The current through the resistor is summed with the negative current through the feedback capacitor into the base of an input transistor. The current through the feedback capacitor is proportional to the rise/fall time of the signal and equal to the current through the resistor.

For example, a device having a data transfer rate of 50 Kbps would have a maximum bit transmission time of ⅟₃₀ Kbps, which equals 30 μs per bit, thus the preferred rise/fall time would be approximately 10 μs. This slow rise/fall time reduces signal reflection in un-terminated or improperly terminated signal lines.

An electrical signal travels at approximately 0.45 ns/m on a transmission line. When the electrical signal encounters the end of an un-terminated line, it is reflected back. If the rise/fall time of a signal is slower than the time required for the reflection to return, then the subsequent signal is undistorted by the reflection.

If the rise/fall time is greater than ⅓ of the bit transmission time, the bit (i.e., signal) is prevented from reaching full amplitude. If the rise/fall time is less than ⅓ of the bit time, the allowable distance of the transmission line is decreased, or signal reflection becomes a problem.

The following descriptions and corresponding figures illustrate an implementation of the present invention in an IB 485 driver. However, the present invention as described above can be implemented in any differential drive circuit requiring signal line load independence and reduction in signal reflection. Therefore, the following should not be taken as the sole embodiments of the present invention, but only as illustrative.

Figure 1A:
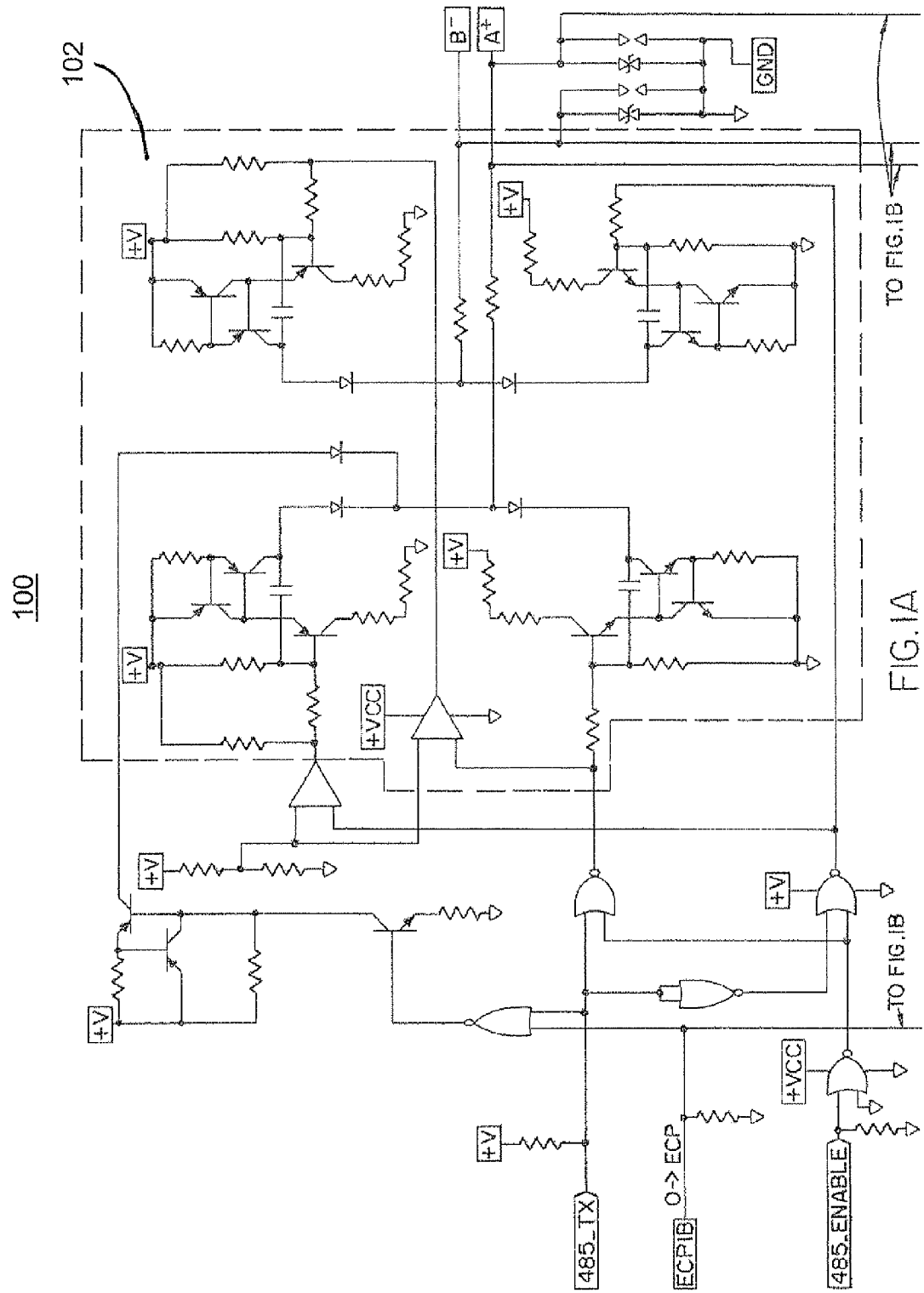

Referring to FIG. 1A and 1B, a schematic of a portion of an IB 485 driver ASIC 100 is shown having a feedback circuit 102, denoted by a dashed line, containing a plurality of feedback sub-circuits. The feedback sub-circuits of the feedback circuit 102 are arranged in an H bridge configuration. The ASIC 100 includes a plurality of leads for providing power, and data to, and for transmitting data from the internal ASIC circuitry. As the feedback sub-circuit is the primary focus of the present invention, the disclosure hereinafter will be limited to a discussion of the feedback sub-circuit.

Figure 2:
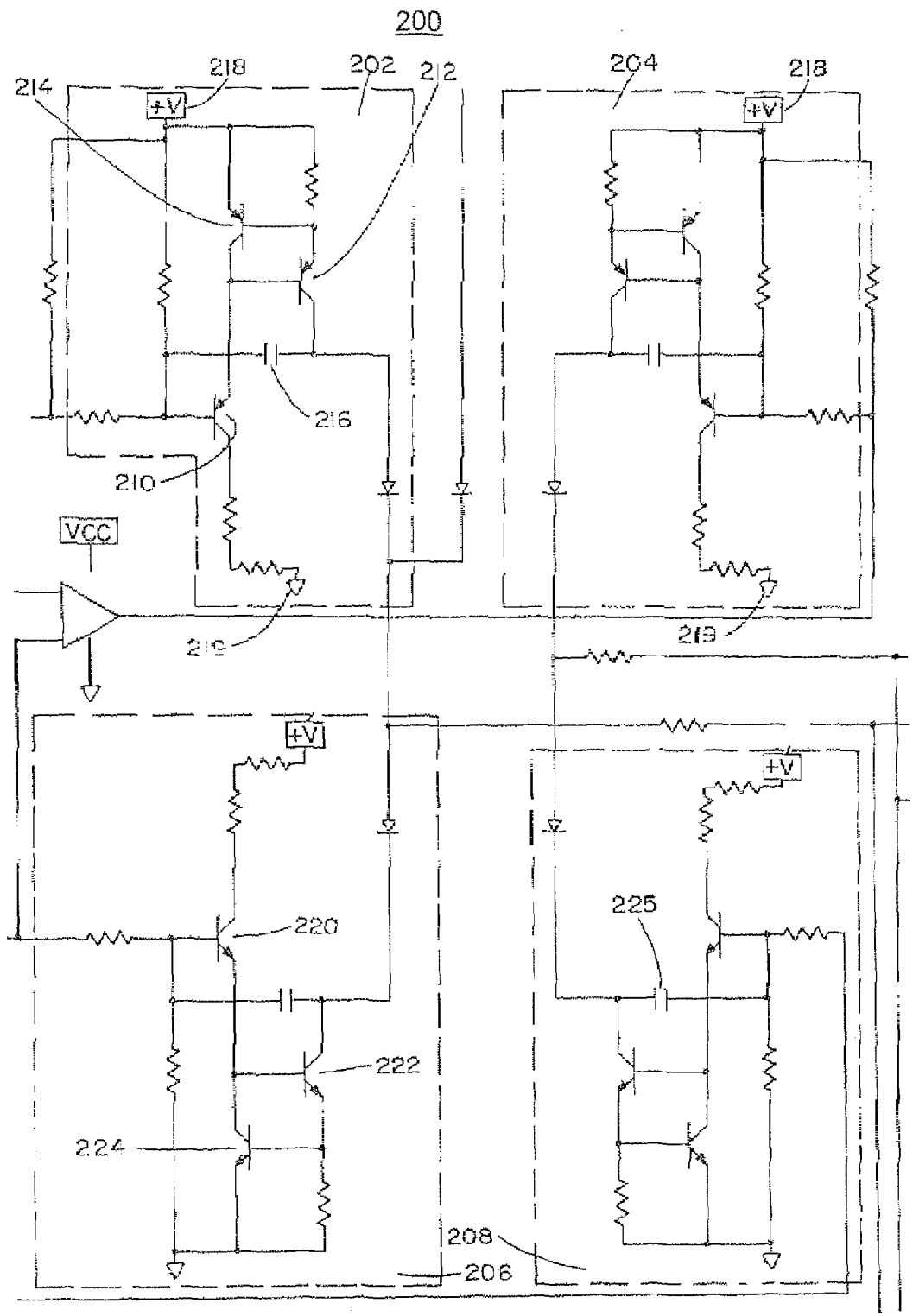
FIG. 2 illustrates an enlarged view of the H bridge configuration as shown in FIG. 1 and delineated by dashed lines.

The feedback sub-circuits are shown in greater detail in FIG. 2. In FIG. 2, the H bridge 200 structure becomes evident, where two feedback sub-circuits 202 and 204 are disposed at the top of the H bridge 200 and act as the source for the H bridge 200. Each of the source feedback sub-circuits 202 and 204 employ three bipolar junction transistors (BJT) 210, 212, 214 having a PNP gate structure. While BJTs are shown and discussed herein, it should be noted that any appropriate transistor type may be used as well, such as a Field Effect Transistor (FET), etc., and thus the present invention is not limited to employing BJTs alone. Additionally, a feedback capacitor 216 electrically connects the base of BJT 210 with the collector of BJT 212. A source voltage 218, preferably 5VDC, is supplied to the source feedback sub-circuits 202 and 204. The source voltage is applied to the emitters of BJTs 212 and 214 and to the base of BJT 210. The collector of BJT 210 is at a ground potential.

The remaining two feedback sub-circuits 206 and 208 are disposed at the bottom portion of the H bridge 200 and act as the drain for the H bridge. Each of the drain feedback sub-circuits 206 and 208 employ three bipolar junction transistors (BJT) 220, 222, 224 having an NPN gate structure. Additionally, a feedback capacitor 225 electrically connects the base of BJT 220 with the collector of BJT 222. As with the source feedback sub-circuits 202 and 204, a source voltage of preferably 5VDC is supplied to the drain feedback sub-circuits 206 and 208. However, in the drain feedback sub-circuits 206 and 208, the source voltage is applied to the collector of BJT 220, while the emitters of BJTs 222 and 224 and to the base of BJT 220 are at the ground potential.

Figure 3:
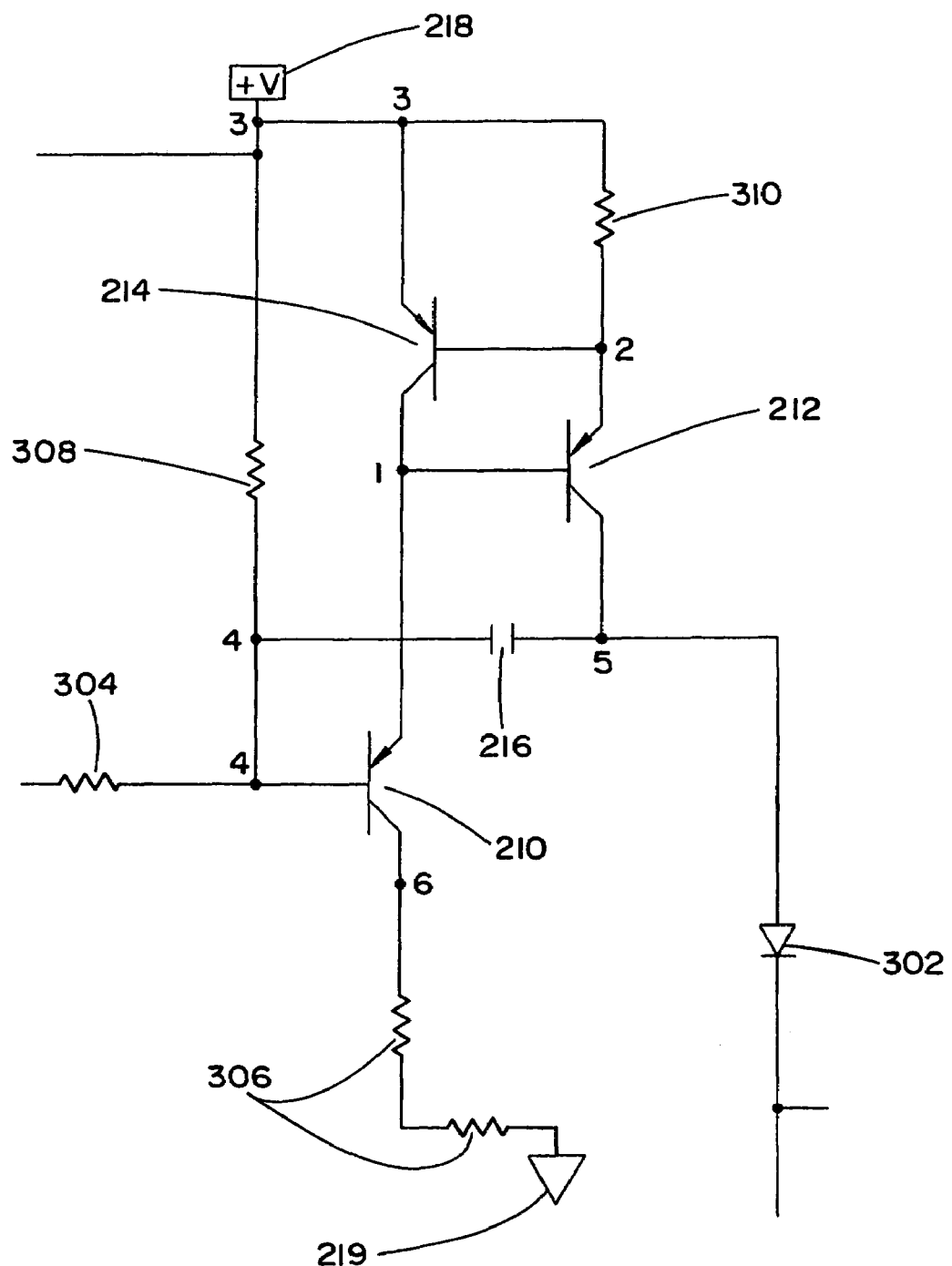
FIG. 3 illustrates an enlarged portion of the H bridge as shown in FIG. 2, showing and designated by reference numeral 202.

FIG. 3 illustrates a further enlargement of one of the feedback sub-circuits. Specifically, the feedback sub-circuit shown is feedback sub-circuit 202 of FIG. 2. However, except for the differences noted above, source feedback sub-circuits 202 and 204 have a similar structure as drain feedback sub-circuits 206 and 208, thus FIG. 3 is applicable to all four feedback sub-circuits 202, 204, 206 and 208.

The feedback sub-circuit 202, as briefly described above, includes three transistors 210, 112 and 214. The base of transistor 212 is connected to the collector of transistor 214 at node 1 and the emitter of transistor 212 is connected to the base of transistor 214 at node 2. The emitter of the third transistor 210 is connected to node 1 as well.

Additionally, a first lead of resistor 304 connects to the base of transistor 210 at node 4. The second lead of resistor 304 acts as an input for the feedback sub-circuit. The collector of transistor 210 connects to one or more resistors 306 at node 6. Resistors 306 are connected to a ground potential 219. Resistor 308 connects at node 3 and node 4, and resistor 310 is connected to node 3 and node 2. Node 3 also connects a positive voltage source 218 to the feedback sub-circuit.

Further, a first lead of diode 302 is connected to node 5. The second lead of diode 302 is adapted as an output of the feedback sub-circuit for emitting an output signal. The output signal is independent of the impedance (i.e., load) of the input signal.

Finally, a first lead of feedback capacitor 216 is connected to the base of transistor 210 at node 4, and a second lead of feedback capacitor 216 is connected to the collector of transistor 212 at node 5. The capacitance of feedback capacitor 216 determines the rise/fall time, which in turn determines the feedback sub-circuit's 202 effectiveness at reducing reflection caused by un-terminated signal lines. Preferentially, a feedback capacitor 216 having a capacitance of 470 pF is selected. A 470 pF feedback capacitor 216 results in a constant rise/fall time of 10 μsec. Regardless of the input line load.

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

What is claimed is:

1. A plurality of feedback sub-circuits for providing line load compensation and reflection reduction in a signal transmitting circuit, each said plurality of feedback sub-circuits comprising:
    a first transistor, a second transistor and a third transistor, an emitter of said first transistor and a collector of said second transistor being connected to a base of said third transistor at a first node, a base of said second transistor being connected to an emitter of said third transistor at a second node;
    a feedback capacitor having a first lead connected to a base of said first transistor at a third node, and said feedback capacitor having a second lead connected to a collector of said third transistor at a fourth node; and
    wherein said feedback capacitor has a capacitance selected to produce a constant rise/fall time regardless of a load of an input received from said signal transmitting circuit and reduces reflection, said constant rise/fall time of said feedback capacitor being equal to a predetermined fractional value of a transmission bit time of said signal transmitting circuit, said bit transmission time being based on a baud rate and a maximum transmission line length.

2. The feedback sub-circuit as in claim 1, further comprising:
    a first resistor having a first lead connected to a first lead of said second transistor at a fifth node, and a second lead connected to said second node;
    a voltage source having a positive lead connected to said fifth node;
    a second resistor having a first lead adapted for being connected to an input signal source having an arbitrarily selected load, and a second lead of said second resistor being connected to said third lead of said first transistor at said third node;
    a third resistor having a first lead connected to said third node, and a second Lead connected to said fifth node;
    a fourth resistor having a first lead connected to a second lead of said first transistor at a sixth node, and a second lead connected to a ground potential; and
    a diode having a first lead connected to said fourth node, and a second lead adapted for emitting an output signal, said output signal being independent of the load of said input signal.

3. The feedback sub-circuit as in claim 1, further comprising an input line adapted for connecting an input signal source having an arbitrarily selected load to said base of said first transistor at said third node.

4. The feedback sub-circuit as in claim 1, wherein said first, second and third transistors are bipolar junction transistors.

5. The feedback sub-circuit as in claim 1, wherein said first, second and third transistors are field effect transistors, said emitter of each transistor being a drain, said collector of each transistor being a source and said base of each transistor being a gate.

6. The feedback sub-circuit of claim 1, wherein said predetermined fractional value is equal to ⅓ of said transmission bit time.

7. The feedback sub-circuit as in claim 1, wherein a plurality of said feedback sub-circuits is integrated with a differential drive circuit.

8. The feedback sub-circuit as in claim 7, wherein four said feedback sub-circuits comprise said plurality of feedback sub-circuits, said four feedback sub-circuits being configured in a H-bridge configuration with two of said four feedback sub-circuits having PNP transistors and a remaining two of said four feedback sub-circuits having NPN transistors.

9. A differential drive circuit having a free topology and variable line load requirement, comprising:
    a plurality of feedback sub-circuit for providing line load compensation and reflection reduction, each feedback sub-circuit of said plurality of feedback sub-circuits comprising:

a first transistor, a second transistor and a third transistor, an emitter of said first transistor and a collector of said second transistor being connected to a base of said third transistor at a first node, a base of said second transistor being connected to an emitter of said third transistor at a second node;

a feedback capacitor having a first lead connected to a base of said first transistor at a third node, and a second lead connected to a collector of said third transistor at a fourth node, wherein said feedback capacitor has a capacitance selected to produce a constant rise/fall time regardless of said load of said input signal and reduced signal reflection, said constant rise/fall time of said feedback capacitor being equal to a predetermined fractional value of a transmission bit time of said signal transmitting circuit;

a first resistor having a first lead connected to an emitter of said second transistor at a fifth node, and a second lead connected to said second node;

a voltage source having a positive lead connected to said fifth node;

a second resistor having a first lead adapted for being connected to an input signal source having an arbitrarily selected load, and a second lead of said second resistor being connected to said base of said first transistor at said third node;

a third resistor having a first lead connected to said third node, and a second lead connected to said fifth node;

a fourth resistor having a first lead connected to a collector of said first transistor at a sixth node, and a second lead connected to a ground potential; and a diode having a first lead connected to said fourth node, and a second lead adapted for emitting an output signal, wherein each said plurality of feedback sub-circuits configured for receiving an input and outputting an output which is independent of a load of said input.

10. The differential drive circuit as in claim 9, wherein said first, second and third transistors are bipolar junction transistors.

11. The differential drive circuit as in claim 9, wherein said first, second and third transistors are bipolar junction transistors, said emitter of each transistor being a drain, said collector of each transistor being a source and said base of each transistor being a gate

12. The differential drive circuit as in claim 9, wherein said predetermined fractional value is equal to ⅓ of said transmission bit time.

13. The differential drive circuit as in claim 9, wherein four said feedback sub-circuits comprise a plurality of feedback sub-circuits, said four feedback sub-circuits being configured in art H-bridge configuration with two of said four feedback sub-circuits having PNP transistors and a remaining two of said four feedback sub-circuits having NPN transistors.

* * * * *